United States Patent [19]
Walther

[11] 3,745,899
[45] July 17, 1973

[54] FILM CARTRIDGE
[75] Inventor: Bernhard Walther, Dessau, Germany
[73] Assignee: VEB Filmfabrik Wolfen, Wolfen, Germany
[22] Filed: Jan. 6, 1972
[21] Appl. No.: 215,821

[52] U.S. Cl. .................................. 95/19, 95/31 CA
[51] Int. Cl. ............................................ G03b 19/04
[58] Field of Search .............. 95/19, 31 CA, 31 FM; 206/46 FM, 59 E

[56] References Cited
UNITED STATES PATENTS
3,523,496  8/1970  Nerwin ................................. 95/31
3,650,489  3/1972  Bresson et al. ..................... 95/31 X Primary Examiner—Samuel S. Matthews
Assistant Examiner—Michael L. Gellner
Attorney—Nolte and Nolte

[57] ABSTRACT

A cartridge is formed of a film magazine drum, a film take-up drum and intermediate structure. Each drum contains an arcuate film guide channel. The apertures of these channels, facing one another, define the film gate. One of the guide channels has an aperture to the outside, opposite the perforations of the film passing through the channel.

4 Claims, 4 Drawing Figures

FILM CARTRIDGE

BACKGROUND AND NATURE OF THE INVENTION

In typical forms of construction, used at present, the photographic film has a guide strip of paper attached to it by means of which it is brought from the magazine chamber into the pickup chamber, while the bridge connecting the two chambers has a window for exposing the film. In that case the film is positioned with the aid of a slotted channel provided in the bridge. Film feed is limited by a pilot pin mechanism engaging the perforations of the film.

In these constructions it has been a drawback that the film, together with the leader strip of paper, must be guided in a channel, which does not guarantee maintenance of the required planar position of the film. In the use of such magazines the film plane is not exclusively fixed by camera element, but is additionally affected by manufacturing tolerances of the magazine. The magazines cannot be used in cameras of high optical quality which require shutters exactly in the image plane, as the pilot pin usually is disposed in the window area.

These drawbacks are avoided by the invention and particularly by the provision of a cartridge which comprises a magazine chamber, a pickup chamber, an arrangement whereby the apertures of these chambers and of guide channels therein define the window, and the provision of an opening in one of the film guiding channels opposite the perforations of the film. The magazine and pickup chambers are disposed behind the image plane.

DRAWINGS

Figure 1:
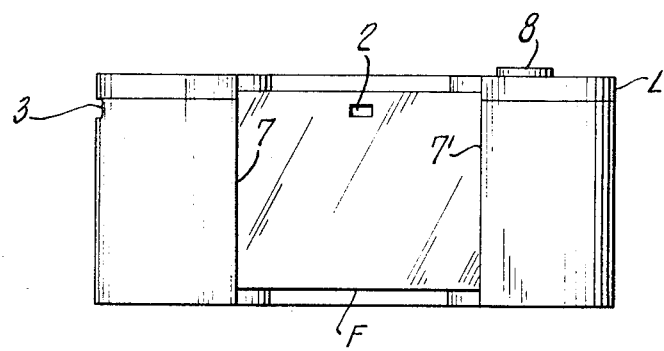
FIG. 1 is a front view of the cartridge.
Figure 2:
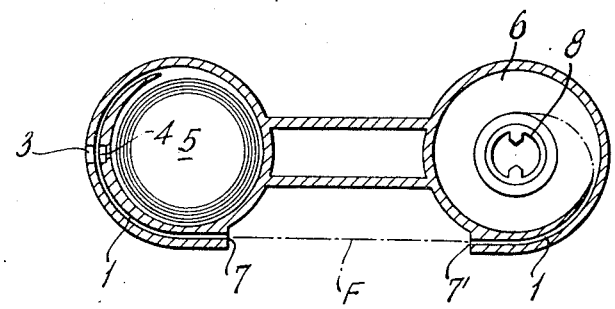
FIG. 2 is a top view of the cartridge with its lid removed.

The new cartridge comprises magazine drum 5, bridge 5' rigidly secured to this drum, and pickup drum 6 rigidly secured to the bridge. These parts are most clearly shown in FIG. 2, where cartridge lid L has been removed. Each drum has an arcuate film guiding channel 1 therein and the openings 7, 7' of these channels, disposed opposite one another, establish the limits of the window for exposure of film F. The film is wound onto reel 8 in pickup drum 6 whereby it can be moved across the camera window, from opening 7 of the channel in magazine drum 5 to opening 7' of the channel in take-up drum 6. The film is moved with the aid of perforations 2 therein and under the control of a pilot pin mechanism, shown in FIG. 3. The camera carries pin 9, opposite opening 3 in the supply cartridge, which opening in turn is opposite the film perforations. The pin is desirably biased by a spring, not shown.

Figure 3:
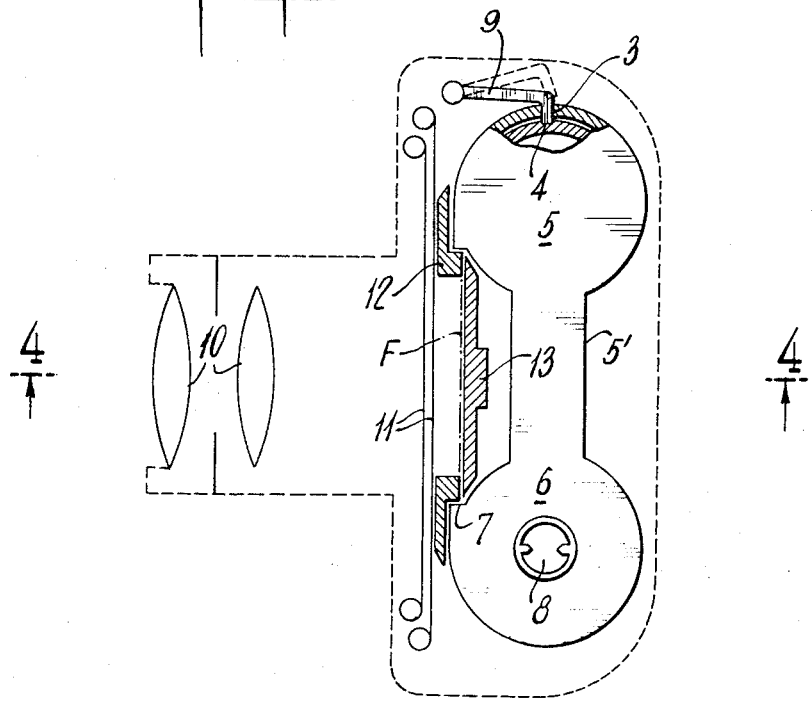
FIG. 3 is a side view of the cartridge, partly broken away and incorporated in a camera.
Figure 4:
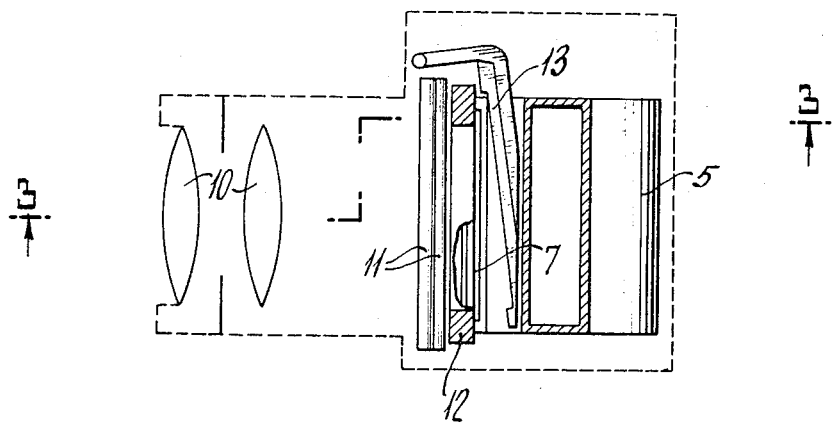
FIG. 4 is a view taken along lines 4—4 in FIG. 3.

As shown by FIGS. 3 and 4, the position of the film is determined by camera aperture member 12 behind shutter 11, this aperture member having film guiding edges directly opposite openings 7, 7' in cartridge 5, 5', 6. While preparing for the exposures of the film, pressure plate 13 of the camera is tilted away from the aperture member, as shown in FIG. 4. Aperture member, film and pressure plate are in mutual contact during normal operation as in indicated in FIG. 3. Light falling into the camera through objective 10 is admitted to the film through shutter 11 and aperture 12, which are parallel to the image plane. The position of the film, in operative condition, is fixed between elements 12 and plate, and is therefore parallel to the shutter.

For this purpose, drums 5 and 6 are behind the image plane; the pilot pin is not disposed in the image area, but at 9 in the area of one of the film guiding channels 1. This is the reason for the provision of opening 3 in the drum structure. Pin 9, carried by the camera, extends through this opening and contacts the film behind the same. As the film is being fed through channel 1 the pin falls into a control aperture 2 each time the film has been promoted by the length of one image. Through this perforation the pin preferably falls into recess 4 in the channel structure, directly opposite opening 3. By suitable camera structure, not shown, the rotation of pickup reel 8 or other connected parts can be stopped when the pin has thus falled into the film control opening, to be released only when shutter 11 has been operated.

What is claimed is:

1. Cartridge for perforated photographic roll film comprising a magazine drum, a pickup drum, means to mutually space and rigidly interconnect said drums, an arcuate film guide channel in each drum, and an opening in the outer wall of one of these channels, in the area of the film perforations, for insertion of a pilot pin remotely of the spacing between said drums.

2. A cartridge according to claim 1 wherein the channel, directly behind the opening, also has a recess for reception of the tip of the pin.

3. A cartridge according to claim 1, constructed and arranged so that said drums, when installed in the camera, are disposed behind the image plane.

4. A cartridge according to claim 1, wherein said drums have shoulders fitting the aperture member of a camera, each shoulder having an opening for passage of the film.

* * * * *